(12) United States Patent
Thunberg

(10) Patent No.: US 11,359,353 B2
(45) Date of Patent: Jun. 14, 2022

(54) METHOD AND SYSTEM FOR CONTROLLING LOADING/UNLOADING OF A MATERIAL

(71) Applicant: VOLVO CONSTRUCTION EQUIPMENT AB, Eskilstuna (SE)

(72) Inventor: Lars Thunberg, Eskilstuna (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 17/425,425

(22) PCT Filed: Jan. 29, 2019

(86) PCT No.: PCT/EP2019/052061
§ 371 (c)(1),
(2) Date: Jul. 23, 2021

(87) PCT Pub. No.: WO2020/156635
PCT Pub. Date: Aug. 6, 2020

(65) Prior Publication Data
US 2022/0042287 A1    Feb. 10, 2022

(51) Int. Cl.
*E02F 9/26* (2006.01)
*H04W 4/44* (2018.01)
*G05B 19/04* (2006.01)

(52) U.S. Cl.
CPC .............. *E02F 9/262* (2013.01); *E02F 9/268* (2013.01); *G05B 19/0405* (2013.01); *H04W 4/44* (2018.02)

(58) Field of Classification Search
CPC ...... E02F 9/262; E02F 9/268; G05B 19/0405; H04W 4/44
See application file for complete search history.

(56) References Cited

U.S. PATENT DOCUMENTS

| | | | |
|---|---|---|---|
| 9,685,009 B2* | 6/2017 | Sprock | G07C 5/008 |
| 2005/0131645 A1* | 6/2005 | Panopoulos | G05D 1/0244 |
| | | | 701/472 |
| 2011/0320033 A1 | 12/2011 | Bresciani et al. | |
| 2016/0282878 A1* | 9/2016 | Stratton | E02F 9/205 |
| 2018/0010954 A1 | 1/2018 | Lowndes et al. | |
| 2018/0329620 A1* | 11/2018 | Cabrespine | G06F 3/0482 |

OTHER PUBLICATIONS

International Search Report and Written Opinion of the International Searching Authority, PCT/EP2019/052061, dated Oct. 22, 2019, 15 pages.
International Preliminary Report on Patentability, PCT/EP2019/052061, dated Mar. 6, 2020, 16 pages.

* cited by examiner

*Primary Examiner* — Russell Frejd
(74) *Attorney, Agent, or Firm* — Sage Patent Group

(57) ABSTRACT

Provided are methods for controlling loading/unloading of a material (from a load-delivering unit to a load-receiving unit, wherein at least one of the load-delivering unit and the load-receiving unit is a working machine vehicle configured to transport a load of material from a first location to a second location, and wherein at least the load-delivering unit is provided with a control unit configured to control operation of the load-delivering unit. Methods include receiving a first signal indicative of the material associated with the load-delivering unit; receiving a second signal indicative of the material intended to be received by the load-receiving unit; and comparing material information related to the first signal with material information related to the second signal.

19 Claims, 4 Drawing Sheets

METHOD AND SYSTEM FOR CONTROLLING LOADING/UNLOADING OF A MATERIAL

CROSS REFERENCE TO RELATED APPLICATIONS

This application is a 35 U.S.C. § 371 national stage application of PCT International Application No. PCT/EP2019/052061 filed on Jan. 29, 2019, the disclosure and content of which is incorporated by reference herein in its entirety.

TECHNICAL FIELD

The invention relates to a method and system for controlling loading/unloading of a material from a load-delivering unit to a load-receiving unit, wherein at least one of the load-delivering unit and the load-receiving unit is a working machine vehicle configured to transport a load of material from a first location to a second location, and wherein at least the load-delivering unit is provided with a control unit configured to control operation of the load-delivering unit.

A main purpose of the invention is to avoid unloading of the wrong type of material at a construction site and thereby avoid mixing of e.g. rock fragments and sand. The invention is typically applicable to working machines within the fields of industrial construction machines or construction equipment, in particular wheel loaders, excavators, articulated haulers and similar vehicles.

BACKGROUND

At larger construction sites various working machines in the form of loader vehicles (excavators etc.) and load-carrying vehicles (articulated haulers, trucks, etc.) are used to load and transport material from a first location, where a material is loaded by means of e.g. an excavator onto a load-receiving hauler, to a second location where the material is unloaded/dumped. The material can be e.g. sand, gravel or rock fragments and the second location can be a material storage location or some form of material handling equipment, such as a crusher. Where different types of material are handled at the site it is important to ensure that the material unloaded at a certain storage location or material handling equipment actually is the type of material that particular storage or equipment is intended to receive. Dumping of a wrong type of material typically leads to a costly and time-consuming clean-up work.

Prevention of dumping/unloading of the wrong type of material can be based on relying on the driver of the load-carrying vehicle that he/she knows what type of material is carried and where to dump that particular load. The driver may also talk over radio to get dumping instructions, signs with dumping information may be placed at dumping sites, and additional workers may be involved in checking the type of material and showing the driver where to dump the load. However, it is clear that it still happens now and then that the wrong type of material is unloaded at locations intended to receive another type of material, for instance because drivers make mistakes. Involving additional workers for controlling type of material etc. reduces the risk of dumping at the wrong place but is costly.

US2018/0010954 discloses a material handling system aiming at getting a material handling vehicle carrying a certain material from a first to a certain second (unloading) location by means of on-board material sensors, communication between the vehicle and a server device, scanners to identify the vehicle at the second location, authorize (or not) the vehicle to enter the second location, etc. However, this system is intended for all types of material and "locations", such as goods for warehouses, and is not particularly adapted to handling of material at a large construction site that may contain several similar loading and unloading zones etc. The means for preventing unloading at the wrong location in US2018/0010954 is to, by means of communication between the first and second locations using server devices and a network, determine whether to allow deposition of the material/payload at the second location, and if deposition is not allowed, to direct the vehicle to an alternative location or back to the first location and/or prevent the vehicle from entering the second location. The latter might be useful to some degree at some large construction sites, but it many situations it is difficult to arrange suitable checkpoints for passage into the second location. Further, "the second location" at a construction site may include several dump zones/unloading locations for different types of material.

There is thus a need for further reducing the risk of unloading the wrong type of material at an unloading location at larger construction sites and similar applications.

SUMMARY

An object of the invention is to provide a method and system that improves handling of material at larger construction sites and similar applications and that in particular reduces the risk of unloading the wrong type of material at an unloading location.

According to a first aspect of the invention, the object is achieved by a method according to claim 1. According to a second aspect of the invention, the object is achieved by a system according to a corresponding independent claim. According to further aspects of the invention, the object is achieved by computer related items and a control unit for carrying out the method.

The method relates to a method for controlling loading/unloading of a material from a load-delivering unit to a load-receiving unit, wherein at least one of the load-delivering unit and the load-receiving unit is a working machine vehicle configured to transport a load of material from a first location to a second location, and wherein at least the load-delivering unit is provided with a control unit configured to control operation of the load-delivering unit.

The method is characterized in that it comprises the steps of: receiving a first signal indicative of the material associated with the load-delivering unit; receiving a second signal indicative of the material intended to be received by the load-receiving unit; comparing material information related to the first signal with material information related to the second signal; determining, based on said comparison, whether the material associated with the load-delivering unit is to be loaded/unloaded to the load-receiving unit; and when an outcome of the determining step is that the material associated with the load-delivering unit is not to be loaded/unloaded to the load-receiving unit, setting, by means of the control unit, the load-delivering unit in a non-loading/non-unloading operation mode where a normal material dumping function of the load-delivering unit is disabled.

In short this prevents, in an efficient manner, unloading/dumping of a certain load of material, such as rock fragments, to a load-receiving unit not intended to receive that load of material. The working machine vehicle is typically a hauler or dump truck configured to transport sand, gravel, rock fragments or similar material from the first location, at which the working machine vehicle can be considered to form a load-receiving unit, to the second location, at which the working machine vehicle can be considered to form a load-delivering unit. In a typical application the first and second locations are different locations at a large construction site.

The information provided in the "signal indicative of the material" typically includes the type of the material, i.e. sand or rock fragments etc., but may alternatively or complementary include i) the amount of the material, such as load weight carried by a hauler or maximum weight currently possible to be received by e.g. a crusher, and/or ii) a geographical position of e.g. a load-receiving stockpile (to distinguish one stockpile from another where both stockpiles are intended to receive the same type of material). The second signal may be sent from a transmitter arranged on or at the load-receiving unit to a receiver arranged on the load-delivering unit.

In one example the load-delivering unit is a loader vehicle in the form of an excavator or a wheel loader and the load-receiving unit is a hauler/dumper, wherein the excavator is arranged to load, say, rock fragments onto the hauler at the first location and wherein the hauler is intended to transport a certain material from the first location to the second location. If it turns out, after the determination step, that the rock fragments about to be loaded onto a hauler by the excavator, i.e. the material associated with the excavator, is not to be loaded onto the hauler positioned for being loaded (because the hauler is set to receive a load of, say, gravel that is intended to be transported to another location or dumping zone than the rock fragments), the excavator is set in the non-loading/non-unloading operation mode where a dumping function of a bucket of the excavator is disabled (at least when the bucket is positioned over or close to the hauler body, which may be controlled by providing the excavator with information on the GPS position of the hauler and on the hauler/dump body). It can thereby be prevented that rock fragments are loaded into a load-receiving container of a hauler intended to receive gravel. It should be noted that the material is in this case not only prevented from being dumped at the wrong location, the material is even prevented from being loaded onto the wrong vehicle.

In a variant of the above example the load-delivering unit can be a conveyor arranged to load material onto e.g. a hauler from some kind of material storage or material processing machine. If it turns out, after the determination step, that an incorrect type of material is about to be loaded, the non-loading/non-unloading operation mode may be realized in that the conveyor is stopped (or is not possible to start).

In another example the load-delivering unit is a hauler/dump truck carrying a load of, say, sand loaded at the first location and the load-receiving unit is a material processing machine, such as a rock fragment crusher, or a material storage pile located at the second location. If it turns out, after the determination step, that the sand, i.e. the material associated with the hauler, about to be unloaded by the hauler positioned at the crusher (or pile) is not to be unloaded at that destination (because the crusher or pile is set to receive a load of rock fragments), the hauler is set in the non-loading/non-unloading operation mode where a dumping (tilting) function of the load-receiving container of the hauler is disabled. It can thereby be prevented that sand is unloaded to a crusher or storage pile intended to receive rock fragments.

In a variant of the latter example the type of material intended to be unloaded at the crusher (or other material processing machine) may be correct but it turns out, after the determination step, that the amount of material carried by the hauler is larger than the crusher (or other material processing machine) currently can receive and that the normal dumping function is disabled for that reason. (The normal dumping function may e.g. be limited so that only a part of the load is unloaded.).

Comparing information and determining whether the material associated with the load-delivering unit actually is to be loaded/unloaded to the intended load-receiving unit can be carried out in different ways involving direct communication between the load-delivering unit and the load-receiving unit or communication via a central production management system arranged on server device, cloud, etc. (such a central system may send out work orders containing mtrl type and amount, load zone, dump zone, etc.). Wireless communication (direct radio/vehicle-to-vehicle communication, wifi, 5G-network, etc.) is well known as such and can be arranged by means of transmitters/receivers connected with control units provided on each of the load-delivering and load-receiving units. Also a central communication unit may be provided with receiver/transmitter of course.

Various information relating to the load-delivering and load-receiving units—such as the type of material to be delivered or received, the amount of material carried by the working machine vehicle, the geographical position (GPS coordinates), and the amount of material that currently can be received (for material processing machines)—can be registered in a data storage device arranged in connection with the central unit (central server, etc.) or on the load-delivering and load-receiving units allowing direct access for the corresponding control unit. As an alternative to central handling of data and communication for material storage piles, a local communication unit that contains receiver, transmitter, control unit, data storage device, etc. may be arranged in association with the pile to allow direct communication with e.g. haulers. The local communication unit could be a static RFID tag that tells e.g. what type of material is valid to dump at the pile.

In the example above where the load-delivering unit is an excavator and the load-receiving unit is a hauler/dumper, both the excavator and the hauler may be provided with communication means (RF receiver/transmitter, etc.) and with information on which type of material to be delivered/received so that they can communicate, i.e. sending indicative signals etc., directly with each other and verify whether the type of material associated with the excavator actually is to be loaded/unloaded to the hauler. In the other example above where the load-delivering unit is a hauler/dumper and the load-receiving unit is a material processing machine (e.g. crusher) or a material storage pile, the communication and verification may be conducted in a similar way (if the material processing machine is provided with communication means etc. and if the pile is associated with a local communication unit as mentioned above). In both examples the communication may alternatively involve a central unit. If a material processing machine forms the load-receiving unit, it may communicate also the amount of material it currently can receive (besides communicating type of material to be received and optionally also its geographical position). Also a conveyor system may be provided with similar communication means.

Information on which type of material that is associated with the load-delivering unit may be obtained from a vision system capable of differentiating between different types of materials. This way the type of material does not necessarily have to be registered manually in the data storage device. Such a vision system could also estimate the amount of material the load-receiving currently can receive.

Some sort of reasonable preliminary plan normally exists for directing the working machine vehicles to certain load-delivering units for loading and to certain processing machines or storage piles for unloading. A completely randomized movement of the working machine vehicles would not be efficient. So the steps of comparing material information and determining whether the material actually should be loaded/unloaded is in many cases, but not necessarily in all cases, a sort of verification of the preliminary intention. The invention eliminates loading and unloading mistakes that otherwise would occur due to errors in or deviations from the preliminary plan (or due to lack of any preliminary plan).

An outcome of the determination step may be that the material associated with the load-delivering unit indeed is to be loaded/unloaded to the intended load-receiving unit. If so, loading/unloading is carried out. However, the outcome of the determination step may instead be that the material associated with the load-delivering unit is not to be loaded/unloaded to the preliminary intended load-receiving unit. The reason may be e.g. wrong type of material, wrong geographical position (wrong storage pile but possibly correct type of material) or too large load of material (load on hauler greater than e.g. a crusher currently can receive). If so, the control unit of the load-delivering unit sets the load-delivering unit in a non-loading/non-unloading operation mode where the normal material dumping function of the load-delivering unit is disabled.

In the non-loading/non-unloading operation mode, a loading vehicle or other loading device is typically prevented from dumping its load (e.g. a bucket of an excavator cannot dump the material contained in the bucket or a conveyor belt is stopped or blocked) and a hauler or similar is typically prevented from unloading what is contained in its load-receiving container. Complete prevention from loading/unloading may, however, not be necessary in this mode; it may instead be arranged so that the normal dumping function is disabled but dumping is still possible via a dumping function that is different compared to the normal dumping function so that unintended dumping is not carried out by mistake in a routine dumping manoeuvre. For instance, the dumping operation can be significantly slowed down or a tactile feedback may be provided in a lever of a loading vehicle so as to make a driver/operator of the vehicle aware of that loading/unloading may not be suitable.

It is not necessary that it is the control unit of load-delivering unit that itself initiates the change of setting of operation mode. A trigging signal may be sent to that control unit from a central communication unit or from another source.

When the loading/unloading operation has been interrupted (by setting the load-delivering unit in the non-(un)loading mode) the working machine vehicle is typically moved or set to move to its correct loading or unloading location. After interruption of the loading/unloading operation, the load-delivering unit is typically reset into a normal operation mode, i.e. it quits its non-loading/non-unloading operation mode, so as to make normal dumping possible again when dumping prevention is not needed anymore. The point of time for reset to normal mode may be when the excavator bucket has been moved in relation to the load-receiving container of the hauler and is located sufficiently far away from the hauler, or when the hauler (in the form of a load-delivering unit) is sufficiently far away from the material processing machine or storage pile.

The inventive method is suitable both for conventional manual vehicles and for autonomous vehicles, in particular for autonomous haulers or other working machine vehicles configured to transport a load of material.

In an embodiment the method comprises the step of, when an outcome of the determining step is that the material associated with the load-delivering unit is to be loaded/unloaded to the load-receiving unit: loading/unloading the material associated with the load-delivering unit to the load-receiving unit.

In an embodiment the load-receiving unit is positioned or is about to be positioned in relation to the load-delivering unit so as to allow for carrying out a loading/unloading operation before carrying out the step of determining whether the material associated with the load-delivering unit is to be loaded/unloaded to the load-receiving unit.

This means that a certain "intended" load-receiving unit is involved in the method. That the load-delivering and load-receiving units are positioned or about to be positioned in relation to each other so as to allow loading/unloading means that one unit (typically the working machine vehicle) or both units (for instance if the load-delivering unit is a movable loading vehicle) are moved and positioned in relation to each other so that loading/unloading can be carried out or at least can be initiated within a short time frame. The invention does not exclude that the comparison and determination steps are carried out somewhat before the two units are arranged in their final loading/unloading positions, which means that the dumping disabling function may be activated at an earlier stage, i.e. somewhat before the two units have been arranged in their final relative loading/unloading positions. However, there is no particular point in activating the dumping disabling function until dumping/unloading is imminent. Some kind of warning signal could very well be activated at this earlier stage though, such as a signal on a display to warn a driver of a vehicle or some other form of signal if autonomous vehicles are involved. The point of time when dumping/unloading is imminent could be e.g. when the bucket of the excavator is above or close to the load-receiving container of the hauler or when the hauler is close to (or the hauler's load-receiving container or a rear edge thereof has been positioned in a certain way in relation to) the material processing machine or material storage pile where dumping is intended.

In an embodiment the first material indicative signal comprises information on a type of the material associated with the load-delivering unit, wherein the second material indicative signal comprises information on a type of the material intended to be received by the load-receiving unit, and wherein the method comprises the step of: determining whether the type of material associated with the load-receiving unit is of the same type as the load-receiving unit is intended to receive.

In an embodiment at least one of the first and second material indicative signals comprises information on an amount of material loaded onto the working machine vehicle.

In an embodiment the load-receiving unit is a material processing machine, wherein the second material indicative signal comprises information on an amount of material that the material processing machine currently can receive, and wherein the method comprises the step of determining whether the material processing machine can receive the amount of material loaded onto the working machine vehicle.

In an embodiment the load-receiving unit is a material processing machine or a material storage pile, wherein the method comprises the steps of: receiving at least one signal indicative of a geographical position of the load-receiving unit and of an intended unloading geographical position for the load-delivering unit, comparing the geographical positions, and determining, based on the comparison of the geographical positions, whether the material associated with the load-delivering unit is to be unloaded to the load-receiving unit.

In an embodiment the method further comprises the step of: transmitting, by wireless communication means comprising a transmitter and a receiver, at least one of the indicative signals to a data handling unit arranged to carry out the steps of comparing information and/or determining whether to load/unload.

The data handling unit may be (a component forming part of) the control unit of the load-delivering unit but may also be another unit capable of communicating with the control unit of the load-delivering unit (for activating the non-loading/non-unloading operation mode), such as a central server unit or a control unit arranged on the load-receiving unit.

In an embodiment the method comprises direct wireless communication of at least one of the indicative signals between the load-delivering unit and the load-receiving unit by means of an electronic transmitter and receiver arranged on each of the load-delivering unit and the load-receiving unit.

In an embodiment the load-delivering unit is a loader vehicle, such as an excavator or a wheel loader, provided with a bucket, wherein the working machine vehicle forms the load-receiving unit, and wherein the loader vehicle is set in its non-loading/non-unloading operation mode by disabling a normal dumping function of the bucket of the loader vehicle.

In an embodiment the working machine vehicle forms the load-delivering unit and comprises a load-receiving container, wherein the load-receiving unit is a material processing unit or a material storage pile, and wherein the working machine vehicle is set in its non-loading/non-unloading operation mode by disabling a normal dumping/tilting function of the load-receiving container.

The system relates to a system for controlling loading/unloading of a material from a load-delivering unit to a load-receiving unit, wherein at least one of the load-delivering unit and the load-receiving unit is a working machine vehicle configured to transport a load of material from a first location to a second location, and wherein at least the load-delivering unit is provided with a control unit configured to control operation of the load-delivering unit.

The system is characterized in that it comprises an arrangement configured to i) receive a first signal indicative of the material associated with the load-delivering unit and receive a second signal indicative of the material intended to be received by the load-receiving unit, ii) compare the information related to the first and second signals, and iii) determine, based on the comparison, whether the material associated with the load-delivering unit actually is to be loaded/unloaded to the load-receiving unit, wherein the load-delivering unit is configured to allow operation in a non-loading/non-unloading operation mode where a normal material dumping function of the load-delivering unit is disabled, and wherein the control unit is configured to be capable of, when it is determined that the material associated with the load-delivering unit is not to be loaded/unloaded to the load-receiving unit, setting the load-delivering unit in the non-loading/non-unloading operation mode.

In an embodiment each of the load-delivering unit and the load-receiving unit is provided with an electronic transmitter and receiver configured to allow wireless communication of at least one of the first and second material indicative signals.

In an embodiment the load-delivering unit is a loader vehicle, such as an excavator or a wheel loader, provided with a bucket, wherein the working machine vehicle forms the load-receiving unit, and wherein a normal dumping function of the bucket of the loader vehicle is disabled when the loader vehicle is set in its non-loading/non-unloading operation mode.

In an embodiment the working machine vehicle forms the load-delivering unit and comprises a load-receiving container, wherein the load-receiving unit is a material processing unit or a material storage pile, and wherein a normal dumping/tilting function of the load-receiving container is disabled when the working machine vehicle is set in its non-loading/non-unloading operation mode.

According to one of the further aspects of the invention it relates to a computer program product comprising program code means for performing the steps of the above method when said program is run on a computer.

According to another of the further aspects of the invention it relates to a computer readable medium carrying a computer program comprising program code means for performing the steps of the above method when said program product is run on a computer.

According to still another of the further aspects of the invention it relates to a control unit for controlling loading/unloading of a material from a load-delivering unit to a load-receiving unit, the control unit being configured to perform the steps of the above method.

In an embodiment the control unit is arranged on the load-delivering unit, wherein the control unit is configured also to control operation of the load-delivering unit.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
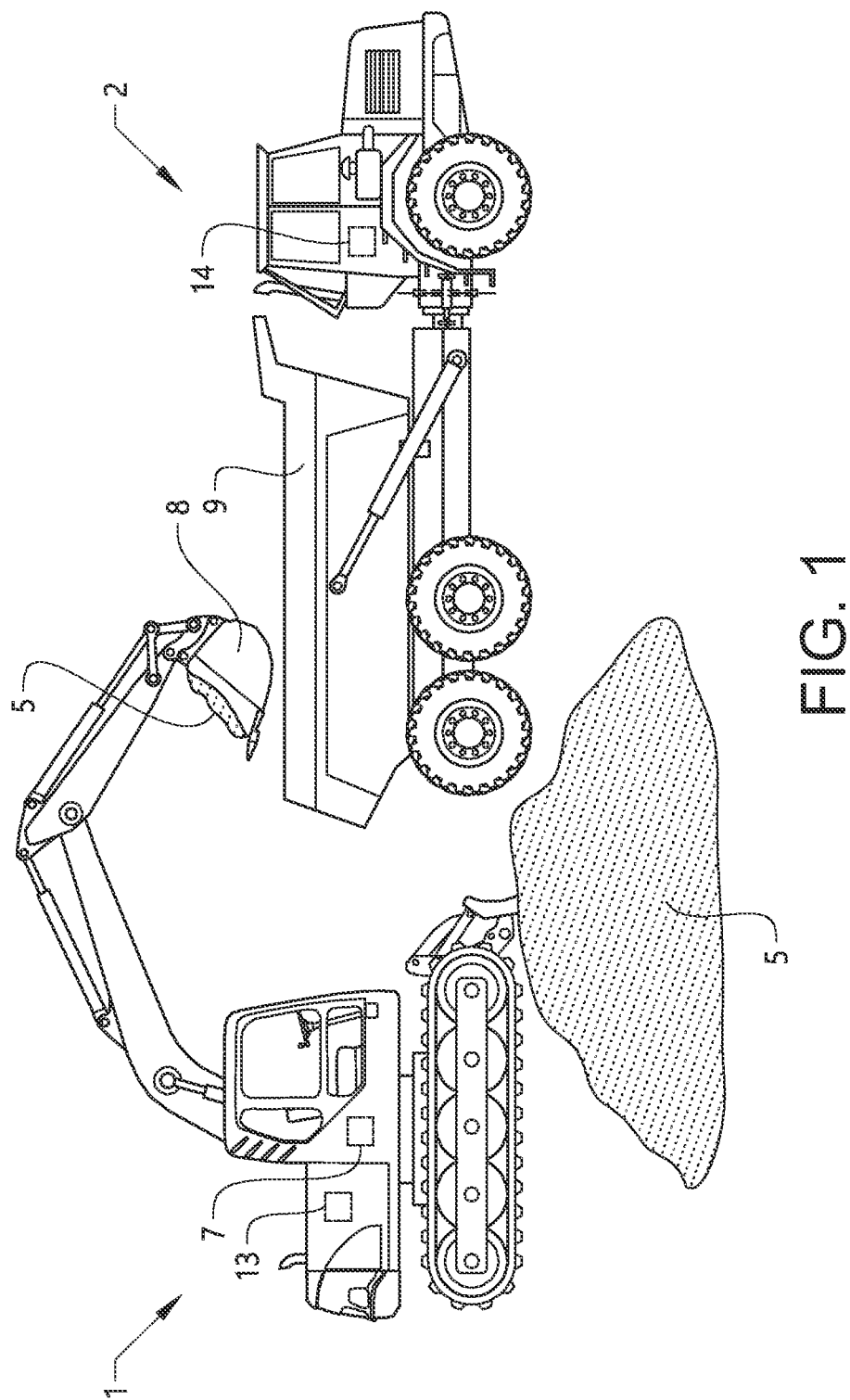
FIG. 1 shows a first example of a pair of load-delivering and load-receiving units in the form of an excavator loading material onto an articulated hauler.
Figure 3:
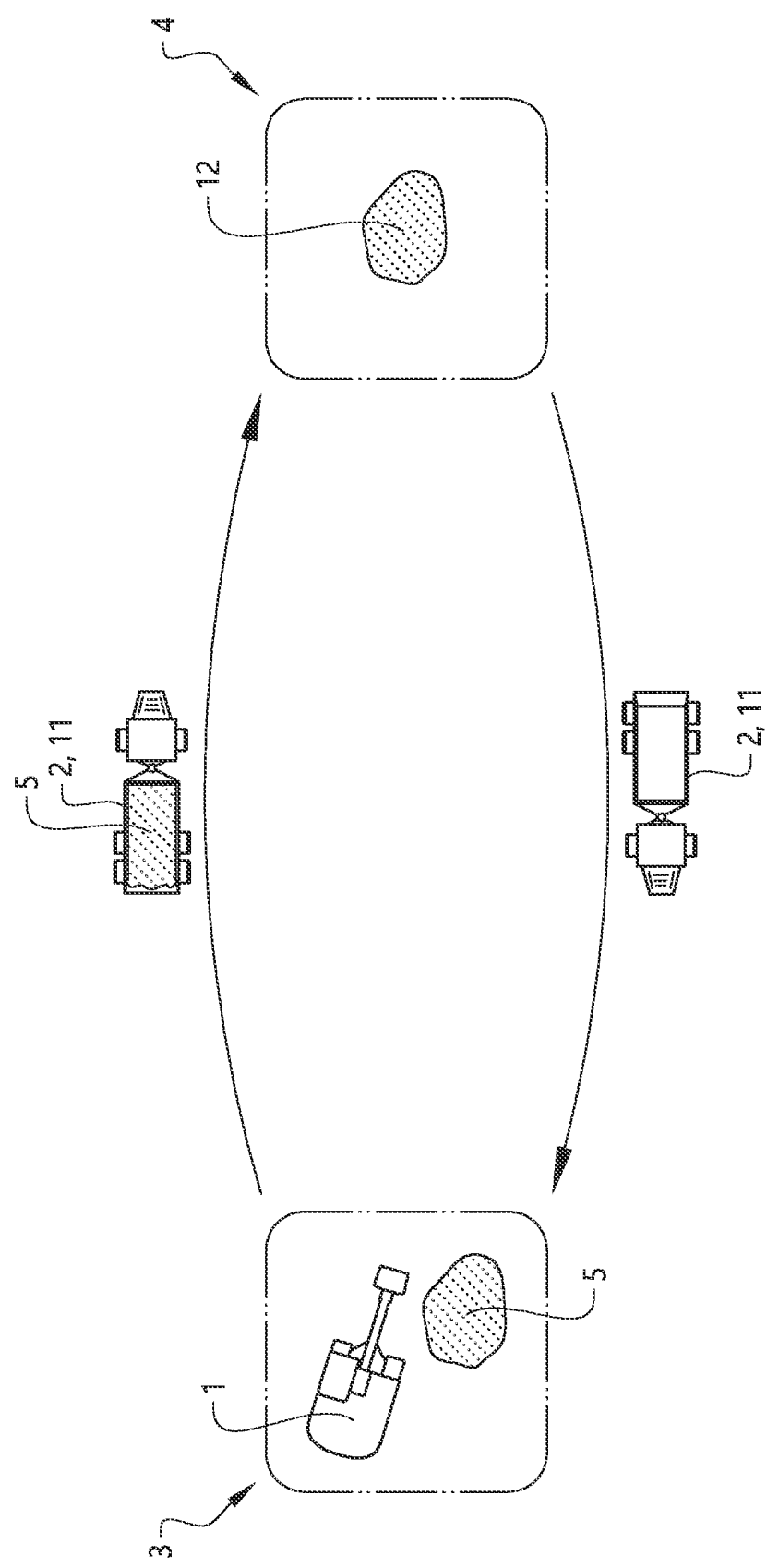
FIG. 3 shows schematically how the articulated hauler transports a load of material from a first location, where it acts as load-receiving unit according to FIG. 1, to a second location, where it acts as a load-delivering unit according to FIG. 2.

FIG. 1 shows a first example of a pair of load-delivering and load-receiving units in the form of an excavator 1 provided with a bucket 8 loading material 5 onto/into a load-receiving container 9 of an articulated hauler 2, which forms a working machine vehicle configured to transport a load of material from a first location 3 to a second location 4 (see FIG. 3). The excavator 1 provided with a control unit 7 (schematically indicated) configured to control operation of the exactor/load-delivering unit 1.

Figure 2:
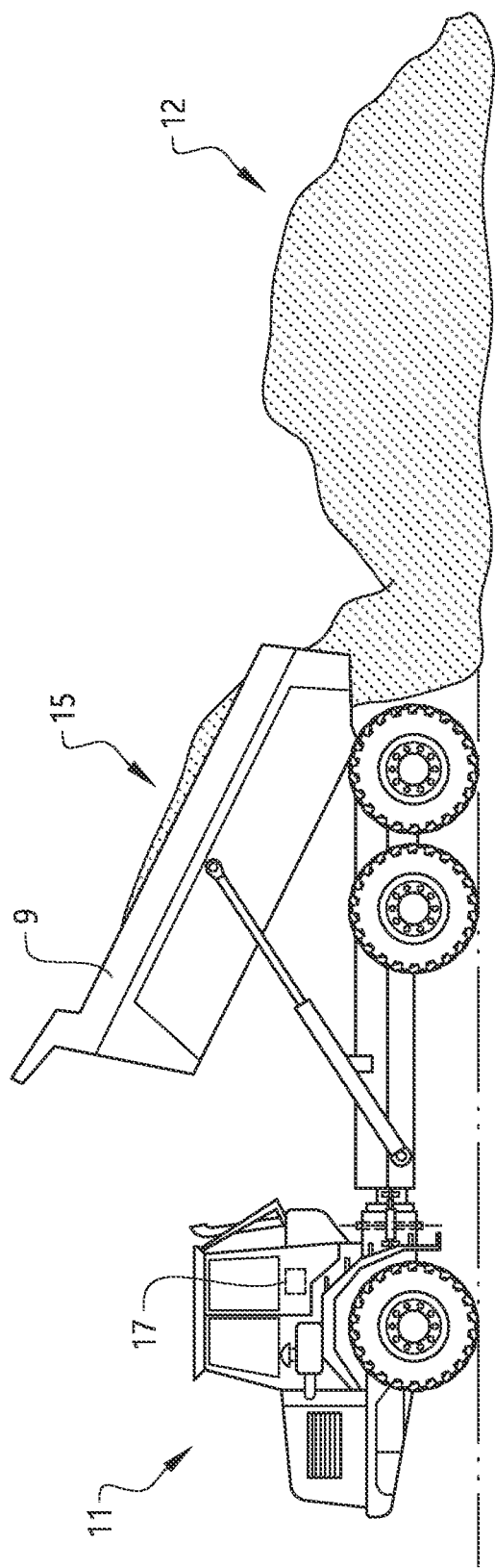
FIG. 2 shows a second example of a pair of load-delivering and load-receiving units in the form of an articulated hauler unloading material to a material storage pile.

FIG. 2 shows a second example of a pair of load-delivering and load-receiving units in the form of an articulated hauler 11, similar to the one shown in FIG. 1, unloading material 15, to a material storage pile 12. The articulated hauler 11 of FIG. 2 is provided with a control unit 17 (schematically indicated) configured to control operation of the hauler/load-delivering unit 11 (in similarity with the load-delivering unit of FIG. 1).

The articulated hauler/working machine vehicle 2, 11 thus forms a load-receiving unit 2 in FIG. 1 and a load-delivering unit 11 in FIG. 2.

The material "associated with the load-delivering unit" is in FIG. 1 the material 5 to be loaded onto the hauler 2, i.e. the material 5 located on the ground and in the bucket 8 of the excavator 1. In FIG. 2, the material "associated with the load-delivering unit" is the material 15 to be unloaded to the material storage pile 12, i.e. the material 15 contained in and about to be unloaded from the load-receiving container 9 of the articulated hauler 11.

Control units for controlling operation of vehicles, machines etc. are very well known as such and almost any vehicle or larger machine is today provided with such a control unit. For instance, also the articulated hauler 2 shown in FIG. 1 is provided with such a control unit. In this disclosure it is emphasized that the load-delivering unit is provided with a control unit since it is used for a particular purpose.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

FIG. 3 shows schematically how the articulated hauler 2, 11 transports a load of material from a first location 3, where it acts as a load-receiving unit 2 according to FIG. 1, to a second location 4, where it acts as a load-delivering unit 11 according to FIG. 2. FIG. 3 is intended to illustrate a construction site where a distance between the first and second locations 3, 4 might be, for instance, a few kilometres. The construction site may of course include many different locations in addition to the indicated first and second locations 3, 4 with various connecting roads, and each location may include several loading and unloading sub-locations for the same or different types of material, so what type of material to be loaded/unloaded and where to transport the material is typically more complex than illustrated in FIG. 3.

In the general case for both the first and second locations 3, 4 the method for controlling loading/unloading of the material 5, 15 from the load-delivering unit (excavator 1 or articulated hauler 11) to the load-receiving unit (articulated hauler 2 or material storage 12) comprises the steps of (see FIG. 4):

S1—receiving a first signal indicative of the material 5, 15 associated with the load-delivering unit 1, 11;

S2—receiving a second signal indicative of the material intended to be received by the load-receiving unit 2, 12;

S3—comparing material information related to the first signal with material information related to the second signal;

S4—determining, based on said comparison, whether the material 5, 15 associated with the load-delivering unit 1, 11 is to be loaded/unloaded to the load-receiving unit 2, 12; and, when an outcome of the determining step (S4) is that the material 5, 15 associated with the load-delivering unit 1, 11 is not to be loaded/unloaded to the load-receiving unit 2, 12, S5a—setting, by means of the control unit 7, 17, the load-delivering unit 1, 11 in a non-loading/non-unloading operation mode where a normal material dumping function of the load-delivering unit 1, 11 is disabled.

When an outcome of the determining step (S4) instead is that the material 5, 15 associated with the load-delivering unit 1, 11 indeed is to be loaded/unloaded to the load-receiving unit 2, 12, which typically would be a common outcome, the method comprises, instead of step S5a, the step of:

S5b—loading/unloading the material 5, 15 associated with the load-delivering unit 1, 11 to the load-receiving unit 2, 12.

It is not necessary that step S1 is carried out before step S2.

In the example illustrated in FIG. 1 each of the load-delivering unit/excavator 1 and the load-receiving unit/hauler 2 is provided with an electronic transmitter and receiver 13, 14 configured to allow wireless communication of at least one of the first and second material 25 indicative signals (as well as to allow wireless communication of other signals and information, which is known as such). Further, the control unit 7 is connected to the receiver of the excavator 1 so that signals received by that receiver is received by the control unit 7. Moreover, the control unit 7 is configured to not only control the operation of the excavator 1 but also to perform the steps of comparing the signals and determining whether the 30 material 5 is to be loaded onto the hauler 2. This means that the second material indicative signal can be sent by the hauler 2 and be received by the control unit 7 of the excavator 1. The first material indicative signal is typically "received" by the control unit 7 at an earlier stage (followed by storing the information contained in the signal), for instance by manually sending the signal to the control unit 7 by a driver/operator of the excavator 1 or by sending 35 the signal automatically in various ways to the control unit 7.

FIG. 1 further illustrates an embodiment where the first material indicative signal comprises information on a type of the material 5 associated with the load-delivering unit 1 and where the second material indicative signal comprises information on a type of the material intended to be received by the load-receiving unit 2. This variant of the method then comprises the step of: determining whether the type of material 5 associated with the load-receiving unit 1 is of the same type as the load-receiving unit 2 is intended to receive. Different types can be e.g. sand, gravel and rock fragments.

Moreover, in this embodiment it is arranged so that the excavator 1 is set in its non-loading/non-unloading operation mode by disabling a normal dumping function of the bucket 8. As mentioned previously, this could be to entirely disable the dumping function of the bucket 8 and prevent any unloading of material 5 into the load-receiving container 9 of the hauler 2.

Figure 4:
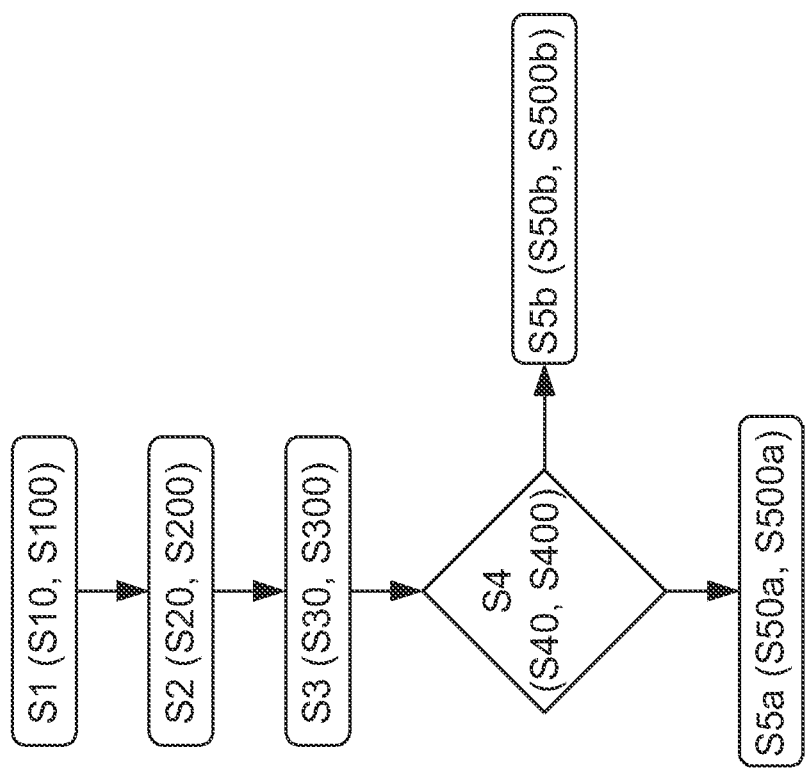
FIG. 4 shows the general steps of the inventive method for controlling loading/unloading of a material from a load-delivering unit to a load-receiving unit, and FIG. 4 also indicates the corresponding steps in a first and second embodiment of the method.

As indicated in FIG. 4, the embodiment of the method illustrated in FIG. 1 thus comprises the following steps:

S10—receiving, by the control unit 7, the first signal indicative of the type of the material 5 associated with the load-delivering excavator 1, by e.g. manually sending the first signal to the control unit 7 on board the excavator 1;

S20—receiving the second signal indicative of the type of the material intended to be received by the load-receiving hauler 2, by sending the second signal from a transmitter arranged on the hauler 2 to the control unit 7 via a receiver arranged on the excavator 1;

S30—comparing, by means of the control unit 7, material information related to the first signal with material information related to the second signal;

S40—determining, by means of the control unit 7 and based on said comparison, whether the type of material 5 associated with the load-delivering excavator 1 is of the same type as the material to be loaded onto the load-receiving hauler 2; and, when an outcome of the determining step (S40) is that the material 5 associated with the load-delivering excavator 1 is not to be loaded to the load-receiving hauler 2, S50a—setting, by means of the control unit 7, the load-delivering excavator 1 in a non-loading/non-unloading operation mode where a normal material dumping function of the bucket 8 of the load-delivering excavator 1 is disabled.

This prevents the wrong type of material to be loaded onto the articulated hauler 2 (which may be designated to dump material at another location intended for another type of material).

When an outcome of the determining step S40 instead is that the material 5 associated with the excavator 1 indeed is to be loaded onto the hauler 2, this variant of the method comprises, instead of step S50a, the step of: S50b—loading the material 5 associated with the excavator 1 to the hauler 2.

The example illustrated in FIG. 2 is in many ways similar to what is described above for FIG. 1. A difference is of course that the load-delivering unit now is the articulated hauler 11, instead of the excavator 1, and that the control unit referred to is the control unit 17 of the hauler 11. The first material indicative signal is thus received by and stored in the control unit 17. If the articulated hauler 11 is the same as the hauler 2 in FIG. 2 the first signal may have been received already before the loading of the hauler 2 (where it formed the second signal).

Another difference is that the second material indicative signal is not sent to the control unit 17 by the material storage pile 12 but by e.g. a local communication unit arranged in association with the pile 12 or a central communication unit having GPS positioning data for both the storage pile 12 and the hauler 11, as further explained previously.

Moreover, in the embodiment related to FIG. 2 it is arranged so that the working machine vehicle/articulated hauler 11 is set in its non-loading/non-unloading operation mode by disabling a normal dumping/tilting function of the load-receiving container 9. As mentioned previously, this could be to entirely disable the dumping function of the container 9, e.g. to make it impossible to tilt the container 9 at all, and prevent any unloading of material 15 to the material storage pile 12.

As indicated in FIG. 4, the embodiment of the method illustrated in FIG. 2 thus comprises the following steps:

S100—receiving, by the control unit 17, the first signal indicative of the type of the material 15 associated with the load-delivering hauler 11, by e.g. manually sending the first signal to the control unit 17 on board the hauler 11;

S200—receiving the second signal indicative of the type of the material intended to be received by the load-receiving material storage pile 12, by sending the second signal from a transmitter arranged on a local communication unit arranged in association with the pile 12 or a central communication unit to the control unit 17 via a receiver arranged on the hauler 11;

S300—comparing, by means of the control unit 17, material information related to the first signal with material information related to the second signal;

S400—determining, by means of the control unit 17 and based on said comparison, whether the type of material 15 associated with the load-delivering hauler 11 is of the same type as the material to be unloaded to the material storage pile 12; and, when an outcome of the determining step (S400) is that the material 15 associated with the load-delivering hauler 11 is not to be loaded to the load-receiving material storage pile 12, S500a—setting, by means of the control unit 17, the load-delivering hauler 1 in a non-loading/non-unloading operation mode where a normal material dumping function of the container 9 of the load-delivering hauler 11 is disabled.

This prevents the wrong type of material to be unloaded to the storage pile 12.

When an outcome of the determining step S400 instead is that the material 15 associated with the hauler 11 indeed is to be unloaded to the material storage pile 12, this second variant of the method comprises, instead of step S500a, the step of: S500b—unloading the material 15 associated with the hauler 11 to the material storage pile 12.

It is to be understood that the present invention is not limited to the embodiments described above and illustrated in the drawings; rather, the skilled person will recognize that many changes and modifications may be made within the scope of the appended claims.

As an alternative to the excavator 1 in FIG. 1 the load-delivering unit can be a wheel loader or other type of loader vehicle, or another type of load-delivering unit, such as a conveyor belt.

As an alternative to the material storage pile 12 in FIG. 2 the load-receiving unit 12 can be a material processing or handling machine, such as a crusher or a conveyor.

Further, at least one of the first and second material indicative signals may comprises information on an amount of material loaded onto the working machine vehicle 2, 11. Such information may be useful during loading of the working machine vehicle/hauler 2 and may be of particular interest when the load-receiving unit 12 is a material processing machine (e.g. a crusher), when the second material indicative signal comprises information on an amount of material that the material processing machine/crusher currently can receive, where the method may comprise the step of determining whether the material processing machine/crusher can receive the amount of material loaded onto the working machine vehicle/hauler 11. This prevents overload of the material processing machine/crusher.

Further, in particular when the load-receiving unit 12 is a material processing machine or a material storage pile, the method may comprise the steps of: receiving at least one signal indicative of a geographical position of the load-receiving unit 12 and of an intended unloading geographical position for the load-delivering hauler 11; comparing the geographical positions; and determining, based on the comparison of the geographical positions, whether the material 15 associated with the load-delivering hauler 11 is to be unloaded to the load-receiving unit 12.

The invention claimed is:

1. A method for controlling loading/unloading of a material from a load-delivering unit to a load-receiving unit at a construction site, wherein at least one of the load-delivering unit and the load-receiving unit is a working machine vehicle in the form of a hauler or dump truck configured to transport a load of material from a first location to a second location, and wherein at least the load-delivering unit is provided with a control unit configured to control operation of the load-delivering unit,
characterized in
that the method comprises the steps of:
receiving a first signal indicative of the material associated with the load-delivering unit;
receiving a second signal indicative of the material intended to be received by the load-receiving unit;
comparing material information related to the first signal with material information related to the second signal;
determining, based on said comparison, whether the material associated with the load-delivering unit is to be loaded/unloaded to the load-receiving unit; and,
when an outcome of the determining step is that the material associated with the load-delivering unit is not to be loaded/unloaded to the load-receiving unit,
setting, by means of the control unit, the load-delivering unit in a non-loading/non-unloading operation mode where a normal material dumping function of the load-delivering unit is disabled.

2. The method according to claim 1, wherein the method comprises the step of, when an outcome of the determining step is that the material associated with the load-delivering unit is to be loaded/unloaded to the load-receiving unit:
loading/unloading the material associated with the load-delivering unit to the load-receiving unit.

3. The method according to claim 1, wherein the load-receiving unit is positioned or about to be positioned in relation to the load-delivering unit so as to allow for carrying out a loading/unloading operation before carrying out the step of determining whether the material associated with the load-delivering unit is to be loaded/unloaded to the load-receiving unit.

4. The method according to claim 1, wherein the first material indicative signal comprises information on a type of the material associated with the load-delivering unit, wherein the second material indicative signal comprises information on a type of the material intended to be received by the load-receiving unit, and wherein the method comprises the step of: determining whether the type of material associated with the load-receiving unit is of the same type as the load-receiving unit is intended to receive.

5. The method according to claim 1, wherein at least one of the first and second material indicative signals comprises information on an amount of material loaded onto the working machine vehicle.

6. The method according to claim 5, wherein the load-receiving unit is a material processing machine, wherein the second material indicative signal comprises information on an amount of material that the material processing machine currently can receive, and wherein the method comprises the step of determining whether the material processing machine can receive the amount of material loaded onto the working machine vehicle.

7. The method according to claim 1, wherein the load-receiving unit is a material processing machine or a material storage pile, wherein the method comprises the steps of:
receiving at least one signal indicative of a geographical position of the load-receiving unit and of an intended unloading geographical position for the load-delivering unit,
comparing the geographical positions, and
determining, based on the comparison of the geographical positions, whether the material associated with the load-delivering unit is to be unloaded to the load-receiving unit.

8. The method according to claim 1, wherein the method further comprises the step of:
transmitting, by wireless communication means comprising a transmitter and a receiver, at least one of the indicative signals to a data handling unit arranged to carry out the steps of comparing information and/or determining whether to load/unload.

9. The method according to claim 1, wherein the method comprises direct wireless communication of at least one of the indicative signals between the load-delivering unit and the load-receiving unit by means of an electronic transmitter and receiver arranged on each of the load-delivering unit and the load-receiving unit.

10. The method according to claim 1, wherein the load-delivering unit is a loader vehicle, such as an excavator or a wheel loader, provided with a bucket, wherein the working machine vehicle forms the load-receiving unit, and wherein the loader vehicle is set in its non-loading/non-unloading operation mode by disabling a normal dumping function of the bucket of the loader vehicle.

11. The method according to claim 1, wherein the working machine vehicle forms the load-delivering unit and comprises a load-receiving container, wherein the load-receiving unit is a material processing unit or a material storage pile, and wherein the working machine vehicle is set in its non-loading/non-unloading operation mode by disabling a normal dumping/tilting function of the load-receiving container-.

12. A system for controlling loading/unloading of a material from a load-delivering unit to a load-receiving unit at a construction site, wherein at least one of the load-delivering unit and the load-receiving unit is a working machine vehicle in the form of a hauler or dump truck configured to transport a load of material from a first location to a second location, and wherein at least the load-delivering unit is provided with a control unit configured to control operation of the load-delivering unit,
characterized in
that the system comprises an arrangement configured to:
receive a first signal indicative of the material associated with the load-delivering unit and receive a second signal indicative of the material intended to be received by the load-receiving unit;
compare the information related to the first and second signals; and
determine, based on the comparison, whether the material associated with the load-delivering unit actually is to be loaded/unloaded to the load-receiving unit,
wherein the load-delivering unit is configured to allow operation in a non-loading/non-unloading operation mode where a normal material dumping function of the load-delivering unit is disabled, and
wherein the control unit is configured to be capable of, when it is determined that the material associated with the load-delivering unit is not to be loaded/unloaded to the load-receiving unit, setting the load-delivering unit in the non-loading/non-unloading operation mode.

13. The system according to claim 12, wherein each of the load-delivering unit and the load-receiving unit is provided with an electronic transmitter and receiver configured to allow wireless communication of at least one of the first and second material indicative signals.

14. The system according to claim 12 or 13, wherein the load-delivering unit is a loader vehicle, such as an excavator or a wheel loader, provided with a bucket, wherein the working machine vehicle forms the load-receiving unit, and wherein a normal dumping function of the bucket of the loader vehicle is disabled when the loader vehicle is set in its non-loading/non-unloading operation mode.

15. The system according to claim 12 or 13, wherein the working machine vehicle forms the load-delivering unit and comprises a load-receiving container, wherein the load-receiving unit is a material processing unit or a material storage pile, and wherein a normal dumping/tilting function of the load-receiving container is disabled when the working machine vehicle is set in its non-loading/non-unloading operation mode.

16. A computer program product comprising program code means for performing the steps of claim 1 when said program is run on a computer.

17. A non-transitory computer readable medium carrying a computer program comprising program code means for performing the steps of claim 1 when said program product is run on a computer.

18. A control unit for controlling loading/unloading of a material from a load-delivering unit to a load-receiving unit, the control unit being configured to perform the steps of the method according to claim 1.

19. The control unit according to claim 18, wherein the control unit is arranged on the load-delivering unit and wherein the control unit is configured also to control operation of the load-delivering unit.

* * * * *